United States Patent [19]
McMurtry et al.

[11] Patent Number: 5,374,125
[45] Date of Patent: Dec. 20, 1994

[54] BEARINGS

[75] Inventors: David R. McMurtry, Wotton-Under-Edge, United Kingdom; David A. Wright, Lothian, Scotland

[73] Assignee: Renishaw Metrology Limited, Gloucestershire, England

[21] Appl. No.: 915,653

[22] Filed: Jul. 21, 1992

[30] Foreign Application Priority Data

Aug. 8, 1991 [GB] United Kingdom ............... 9117089

[51] Int. Cl.⁵ ............................................. F16C 32/06
[52] U.S. Cl. ................................................ 384/9; 384/12
[58] Field of Search .................... 384/9, 12, 29, 30, 42

[56] References Cited

U.S. PATENT DOCUMENTS

| | | | |
|---|---|---|---|
| 4,264,112 | 4/1981 | Magnuson | 384/29 |
| 4,506,935 | 3/1985 | Suzuki et al. | 384/12 |
| 4,541,673 | 9/1985 | Greiert | 384/42 |

FOREIGN PATENT DOCUMENTS

| | | |
|---|---|---|
| 0207215 | 2/1986 | European Pat. Off. |
| 0439296A2 | 7/1991 | European Pat. Off. |
| 466849 | 5/1914 | France . |
| 2163343 | 6/1973 | Germany . |

*Primary Examiner*—Lenard A. Footland
*Attorney, Agent, or Firm*—Oliff & Berridge

[57] ABSTRACT

A machine is disclosed having novel air bearings for supporting one machine part for translational movement on another part in a first direction X. Each bearing takes the form of a track (5A,14,16) on one of the parts providing concave part-cylindrical bearing surfaces (5A,14A,16A) and pads 25 on the other part providing confronting convex part-cylindrical bearing surfaces 25A. The arc lengths of the part-cylindrical bearing surfaces are such as to provide restraint against relative movements between the machine parts in at least one sense of both of the two directions (Y,Z) orthogonal to the direction (X) of the translational movement. The advantages are relative cheapness of manufacture compared to vee-bearings and a capability of the bearings to self-align under load.

24 Claims, 2 Drawing Sheets

BEARINGS

BACKGROUND OF THE INVENTION

The present invention relates to bearings and in particular relates to bearings for translational slideway systems. In one embodiment the invention relates to gas bearings for such systems.

In mounting machine parts to slide on gas bearings it is often required to provide bearing surfaces between the parts which will restrain movement of the machine parts in two orthogonal directions.

In the past it has been common to provide two air bearing surfaces at right angles on one part with confronting air bearing surfaces on the other part to form a vee guide. It is important for the relative alignment of the two orthogonal surfaces to be extremely accurate in order that the very small clearances required for proper operation of the air bearing are not adversely affected by relative misalignment of the surfaces. This is difficult to achieve in practice and results in costly machining operations, and/or the provision of some form of articulation to enable self-alignment to take place.

Also it is known to provide an air bearing in the form of a hollow cylinder mounted for movement along a cylindrical guideway. Such bearings, however, are not practical in a machine, for example a measuring machine, having long guideways since the guideway can only be supported at its ends, and it is difficult under such circumstances to ensure adequate stiffness of the guideway to maintain measurement accuracy.

SUMMARY OF THE INVENTION

The present invention has for one of its objects the provision of a bearing in which these disadvantages are obviated or at least reduced.

According to the present invention there is provided a bearing comprising a first bearing element and a second bearing element relatively positionable to allow one of the elements to be supported on the other with freedom of relative translation between the elements in a first direction, characterised in that:
one of the bearing elements has a convex part-cylindrical bearing surface formed thereon, the other one of the bearing elements has a concave part-cylindrical bearing surface formed thereon, which confronts the convex part-cylindrical bearing surface and in that said bearing surfaces are of sufficient arc length to provide restraint against relative movement between the bearing surfaces in at least one sense of both of the directions orthogonal to said first direction.

Such a bearing has the ability to self-align the confronting bearing surfaces by relative rotation about the translation axis i.e. the axis of each of the part-cylindrical surfaces.

In a particular form of the invention the bearing is designed for a translational slideway of a machine tool or a co-ordinate measuring machine.

Also in a preferred embodiment the bearing is an air bearing and means are provided for supplying air under pressure between the confronting surfaces of the two machine parts.

Also according to the invention there is provided a machine having a first part slidable relative to a second part and including bearing means incorporating a bearing of the present invention for supporting the first part on the second part to allow sliding movement thereof in a first direction while restraining relative movement between the parts in at least one sense of both of the directions orthogonal to the first direction.

Preferably means are provided for pre-loading the bearings, which means may also provide for relative movement to take place between the opposing bearings in the direction towards or away from each other to avoid over-constraining the bearings.

BRIEF DESCRIPTION OF THE DRAWINGS

The invention will now be more particularly described, by way of example only, with reference to the accompanying drawings in which.

DETAILED DESCRIPTION OF THE PREFERRED EMBODIMENTS

Figure 1:
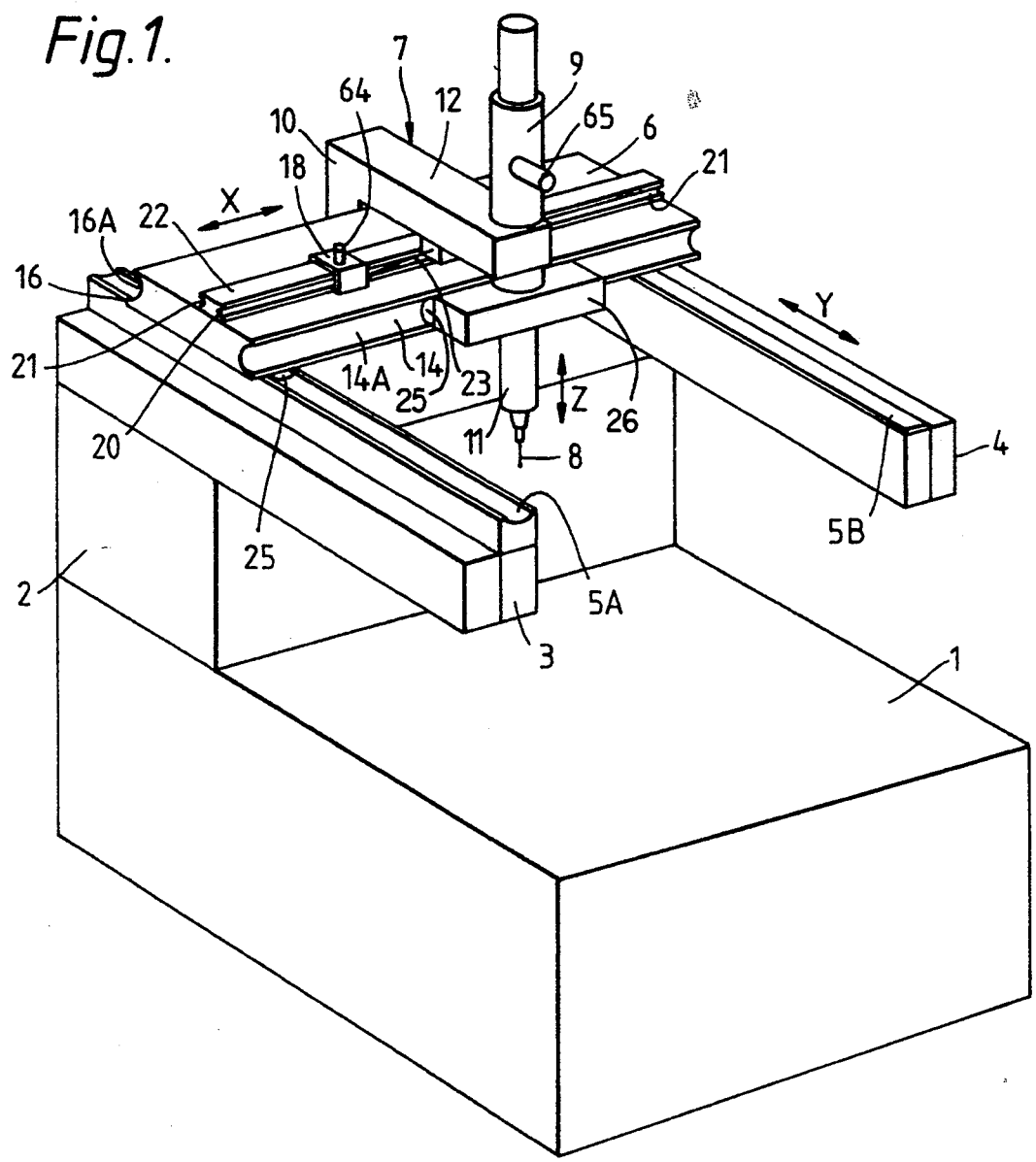
FIG. 1 illustrates the overall construction of a scanning machine including cylindrical air bearings made in accordance with the present invention.

Referring now to the drawings in FIG. 1, there is shown a machine having a base 1, a pillar 2 upstanding from one end of the base and which is elongate in a direction defined as the X co-ordinate direction of the machine. Two beams 3 and 4 are positioned on top of the pillar, one at each end thereof, and which extend in a direction orthogonal to the X direction, defined as the Y co-ordinate direction, to overlie the base.

Each of the beams 3 and 4 has at least part of its top surface formed as an air bearing surface 5A and 5B, for supporting a bridge member or support member 6. The air bearing surface 5A of beam 3 is formed as a part-cylindrical air bearing surface in accordance with the present invention, and the air bearing surface 5B of beam 4 is a flat surface. The bridge member 6, the beams 3 and 4 and the top surface of the base 1 surround the working volume of the machine.

Figure 2:
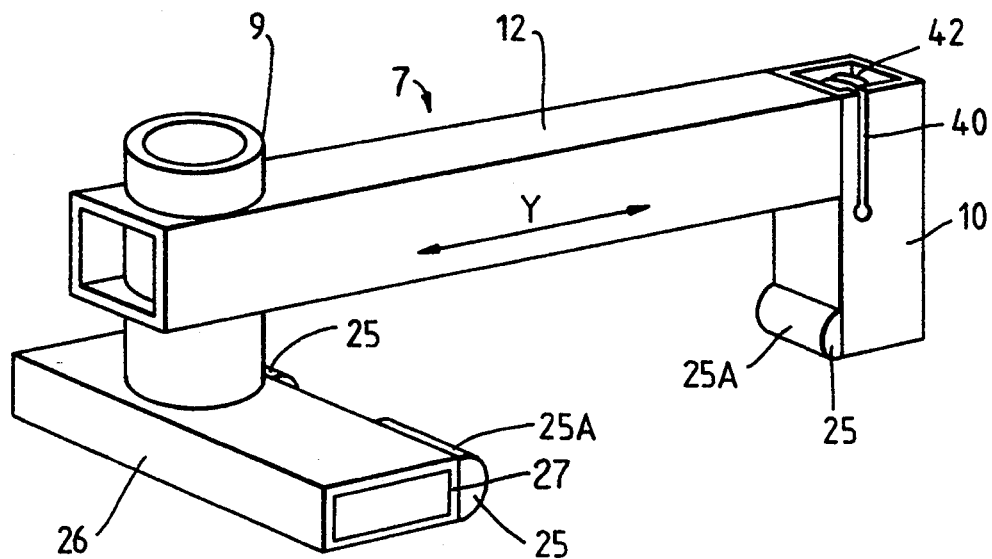
FIG. 2 is a perspective view of the carriage of the machine of FIG. 1 showing the air bearings in more detail.

The bridge member 6 supports a carriage or movable member 7 which comprises two vertical pillars 9 and 10 separated by a cross-member. The carriage 7 is supported on bridge member 6 for movement in the X direction on air bearings on each side of the bridge member 6. Each air bearing consists of a concave bearing element 14 or 16 on the bridge member 6, and a convex bearing element 25 on the carriage 7 (to be described with reference to FIG. 2). As can be seen from FIG. 1, the concave bearing elements 14,16 are formed with part cylindrical bearing surfaces 14A,16A.

The pillar 9 supports a spindle 11 which in turn carries a probe 8 which extends downwardly into the working volume of the machine for taking measurements on a workpiece (not shown). The probe may be of any desired design, but in the particular example of the machine described herein, the probe is of the type described in our co-pending U.K. Patent Application No. 9111364.7 to perform a scanning measurement on a workpiece.

Movement of the carriage in the X direction is produced by a sledge 18 running in channels 20 and 21 formed on a track 22 fixed to the bridge member. The sledge is connected to the carriage preferably near to the mean centroid (in the Y and Z directions) of the relevant moving mass, by a pair of flexible rods 23,24 attached to a bracket on the bridge member 6.

Movement of the probe in Y direction is provided by a similar sledge (not shown) mounted for movement in the Y direction on a track mounted between the beams 3 and 4, and connected to the bridge member 6 by a pair of flexible drive rods. The sledge is driven in similar manner from a rack mounted on the track by a pinion driven by a sledge-mounted motor (none of which is illustrated in the drawings).

Movement of the probe in the Z direction is provided by a motor 65 (FIG. 1) mounted on the exterior of the pillar 9. The motor has a shaft passing through the wall of the pillar and which carries at its end a pinion engaging a rack (not shown) extending in the Z direction and mounted on a shaft inside the pillar to which the probe is connected. The movement of the probe shaft is guided by a further air bearing (not shown) within the pillar.

All of the above-described movements of the probe are measured by scale and scale reader assemblies which may be of any known type suitably disposed on all the respective axes. Signals from the scale readers are passed in known manner to the machine control system for providing feedback to a closed loop control system (not shown) which controls the overall operation of the machine.

For a detailed description of the air bearings or bearing means of the present invention reference will be made to the bearings supporting the carriage 7 for movement on the bridge member 6, but it is to be understood that the same design principles can be applied to the other bearings of the machine. It will also be understood that the positions of the convex and concave surfaces described below on the moving and fixed parts of the machine may be reversed.

The air bearing surfaces 14A and 16A of the bearing elements 14,16 on the bridge member 6 are continuous, concave surfaces of part-cylindrical form extending along each side of the bridge member. These may be formed in any known manner, e.g. by grinding or turning, die-forming or by a replication technique. For example, in one method where the bridge member is made from a lightweight metal such as Aluminium, the bridge member is mounted on a surface or slideway of a grinding machine and a high speed diamond fly cutter is passed down each side. This operation is preferably carried out without re-positioning the workpiece so that accurate relative alignment is maintained between the two surfaces.

Another method of manufacture is to cut the concave surfaces to a reasonably accurate standard, line them with a curable resin material with low shrinkage characteristics, and impress into the resin, during curing, a cylindrical mandrel made with very precise form.

By this means accurate replication of the form of the mandrel along the whole length of the concave surface can be maintained.

The other bearing elements making up the air bearings are formed as convex part-cylindrical pads (FIG. 2), of which two are mounted on a hollow platform 26 connected to pillar 9 of carriage 7 to form the front bearing, and one is connected to pillar 10 to form the rear bearing, thus providing part-cylindrical bearing surfaces 25A at three locations for supporting the carriage 7 on the bridge member 6.

Each of the pads may be formed in any convenient manner, but the preferred manner is to form a complete cylinder, which is relatively easy to manufacture to an accurate size with high quality surface finish, and then to cut it longitudinally into two halves. This has the benefit that the two convex, part-cylindrical pads so formed will not be completely semi-cylindrical, so that when they are connected to the platform 26, the centre 27 of the circle from which the curved surface is formed will be in the material of the platform 26. Since all of the forces on the curved surface will be radial, they will all be directed towards said centre in the material of the platform and any lateral component will be reacted by the material of the platform with no additional bending component.

If the shrinkage of the resin, which is used in the replication technique, can be accurately controlled, the mandrel used for forming the concave surface of the bearing may be made out of appropriate bearing material so that it can be subsequently cut up to form the convex bearing pads.

Figure 3:
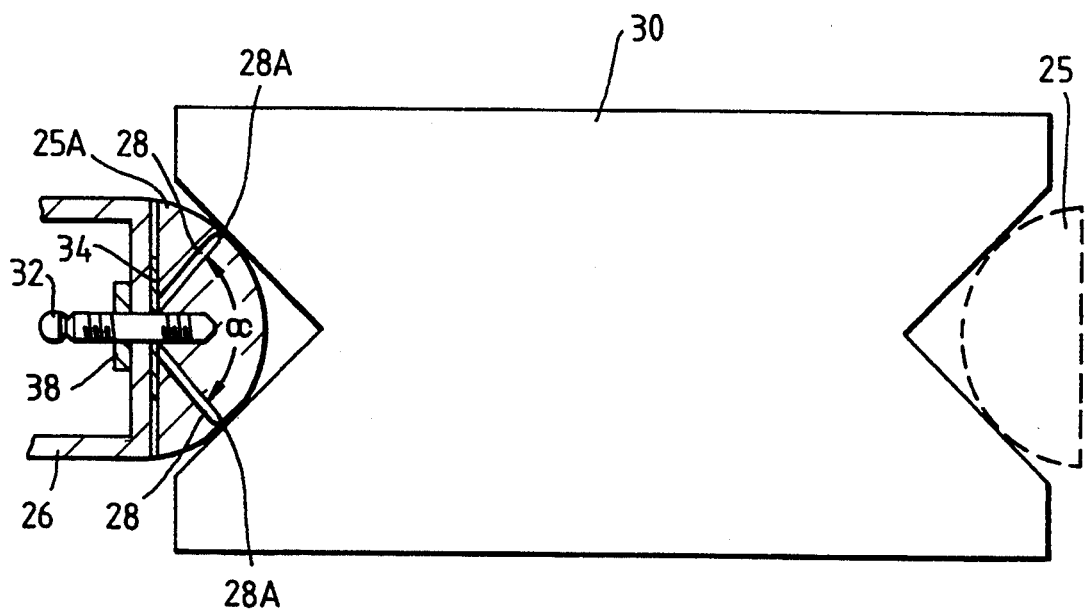
FIG. 3 is an enlarged end view of one of the convex parts of a cylindrical air bearing of FIG. 1 in a jig during an alignment operation.

As can be seen from FIG. 3 the part-cylindrical pads, once cut to length, are drilled to form two air passages 28 therethrough which terminate in orifices 28A to enable pressurised air to be directed between the bearing surfaces. The figure shows part of a jig 30 which is used to align the bearing pads as they are assembled onto the bridge member 12. The jig has a first elongate vee-groove on one side for receiving two of the pads 25, and which serves to align them onto a common axis. The jig has a second vee-groove on its opposite side, which is very accurately aligned with the first vee-groove, for receiving the third bearing pad. Only one of the pads 25 to be aligned in the first vee groove is shown in the jig, the position of the pad in the second vee-groove only being indicated in dotted lines on the opposite side of the jig.

The bearing pads are attached to the bridge member 12 while in position in the jig as follows:

Air supply nipples 32 each with an integral spacer 34 are passed through the wall of the platform 26. The bearing pads are screwed onto the other ends of the nipples, the spacers ensuring that gaps remain between the bearing pads and the wall 26. At this stage the pads are free to tilt in both planes to ensure correct alignment of their axes with the vee-groove in both planes. Glue is added into the gaps between the pads and the wall to stabilise the assembly. To ensure that the alignment of the pad is not disturbed in use, a nut 38 is screwed onto the nipple once the glue has set. A similar procedure is used for attaching the other bearing pads.

The three part-cylindrical bearing pads 25 provide constraint for the structure against pitch, roll, and yaw rotations and against linear movements in the orthogonal Z and Y directions while allowing sliding movements of the carriage along the bridge member in the X direction.

In order to provide the necessary pre-load on the bearings in the Y direction to maintain the correct relative positions of the bearing surfaces in that direction, a slit 40 is made in the top of pillar 10 (FIG. 2), and a strong spring indicated diagrammatically at 42 is placed in the pillar under compressive stress. The result is that the force of the spring urging the outer wall of the pillar away from the end of the cross-member 12 in the Y direction is reacted at the bottom of the pillar producing a force in the Y direction urging the bearing pad into contact with the concave surface of the bearing on the bridge member 6.

This construction not only provides the pre-load in the Y direction required for proper operation of the air bearings, but it also provides freedom for the rear bearing pad 25 to translate in the Y direction to avoid over-constraint of the bearing system.

The fact that the bearing elements 25 are capable of self-aligning about the axis of the part-cylindrical bearing surfaces is a significant advantage in allowing the above-described bearing pre-load arrangement to be used. This is because when the spring load is applied to the bearing system there will inevitably be pivoting of part of the pillar 10 which can be accommodated in the bearing. Thus any distortion in the Y-Z plane applied to the bearing by the pre-load forces, or any other external forces will not cause bearing mis-alignment.

Another novel feature of the present invention is the way in which the pre-load in the Y direction and the angular orientation of the air orifices are combined to improve the stiffness of the bearing.

Referring again to FIG. 3 it can be seen that the air orifices are directed so that the included angle between them $\alpha$ is greater than 90°, e.g. it may be 100°. Thus the inclination $\alpha/2$ of the direction of the gas jets to the direction Y of the pre-load is greater than 45°. The effect of this is to ensure that the forces produced by the air orifices in operation have a greater component in the Z direction than in the Y direction thus providing for greater stiffness in the Z direction than in the Y direction, the latter being provided by the spring 42. Thus a more even stiffness all round can be provided.

Although the bearing has been described with reference to an air bearing embodiment, other gaseous fluids may be used. However, the advantages of the part-cylindrical form are equally applicable to a journal bearing. For example, if the resin used in the replication technique for forming the concave surfaces is a low friction material it is not necessary to provide the air film to lubricate the bearing. Thus the invention can also provide a part-cylindrical journal bearing having the self-aligning feature and of relatively simple inexpensive construction.

Figure 4:
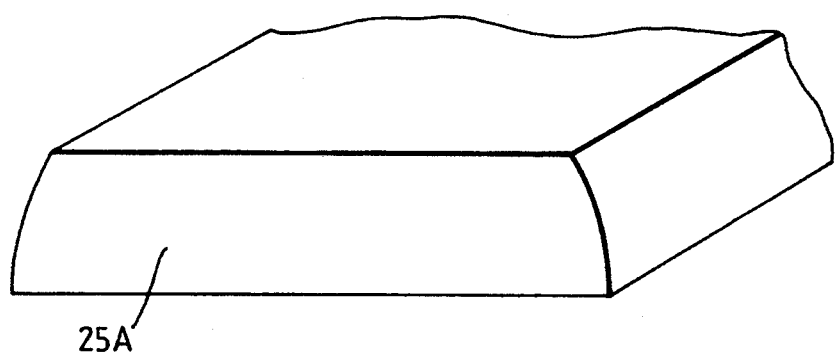
FIG. 4 is an enlarged view of a modified bearing element of the present invention.

Another enhancement which may be used is to truncate the convex bearing elements 25 as shown in FIG. 4 reducing the part-cylindrical bearing surfaces 25A to two separate portions on opposite sides of the bearing element 25. This enables the bearing to behave like a vee-bearing while retaining the self-aligning capability of half cylinder.

We claim:

1. A machine comprising a movable member, a support member and bearing means for supporting the movable member on the support member for sliding movement in a first direction, the bearing means comprising first and second elongate bearing elements on the support member which extend in the first direction and which are spaced apart in a second direction transverse to the first direction, the bearing means further comprising three bearing elements provided on the movable member, two of the bearing elements on the movable member being spaced apart in the first direction and cooperating with the first bearing element on the support member, at least said first bearing element on the support member and the two spaced apart bearing elements on the movable member which cooperate with said first bearing element having bearing surfaces of partially cylindrical shape, wherein the bearing surfaces of the spaced apart bearing elements on one of the movable member and the support member are convex and have the form of at least one arc of a circle, the center of the arc lying within said one of the movable member and the support member.

2. A machine as claimed in claim 1, wherein the partially cylindrical bearing surface of said first bearing element on the support member is concave and the bearing surfaces of the spaced apart bearing elements on the movable member are convex.

3. A machine as claimed in claim 1, wherein the first and second bearing elements on the support member have partially cylindrical bearing surfaces which face in opposite directions substantially parallel to the second direction, wherein the bearing elements on the movable member cooperate with the bearing elements on the support member and have partially cylindrical bearing surfaces which face in opposite directions substantially parallel to the second direction to confront the bearing surfaces on the support member, and wherein means are provided for producing a pre-loading force along the second direction between the confronting bearing surfaces.

4. A machine as claimed in claim 1, further comprising means for supplying gaseous fluid under pressure to the bearing surfaces, wherein the means for supplying gaseous fluid comprises a pair of jets disposed in a plane in which the second direction lies and in which a third direction orthogonal to the first and second directions lies, said jets being inclined with respect to the second direction at equal, opposite angles of more than 45°.

5. A machine comprising a movable member, a support member and bearing means for supporting the movable member on the support member for sliding movement in a first direction, the bearing means comprising two elongate bearing elements on the support member which extend in the first direction and are spaced apart in a second direction transverse to the first direction and which have partially cylindrical bearing surfaces facing in opposite directions substantially parallel to the second direction, the bearing means further comprising bearing elements on the movable member which have partially cylindrical bearing surfaces facing in opposite directions substantially parallel to the second direction to confront the bearing surfaces on the support member, means being provided for producing a pre-loading force between the confronting bearing surfaces in the second direction.

6. A machine as claimed in claim 5, wherein the means for producing a pre-loading force between the confronting bearing surfaces comprises resilient means for allowing relative movement to take place in the second direction between the oppositely-facing bearing surfaces on the movable member.

7. A machine as claimed in claim 6, wherein the resilient means comprises a spring.

8. A machine as claimed in claim 5, wherein the partially cylindrical bearing surfaces of the bearing elements on the support member open in opposite directions substantially parallel to the second direction.

9. A machine as claimed in claim 5, wherein the bearing surfaces of at least one of the bearing elements on the movable member and at least one of the bearing elements on the support member are configured to allow at least one of the bearing elements on the movable member to shift relative to at least one of the bearing elements on the support member as the pre-loading force is produced.

10. A machine as claimed in claim 5, wherein the movable member comprises two pillars positioned one on each side of the support member.

11. A machine as claimed in claim 10, further comprising resilient means for urging at least one of said pillars towards the other of said pillars to produce said pre-loading force.

12. A machine comprising a movable member, a support member and bearing means for supporting the movable member on the support member for sliding movement in a first direction, the bearing means comprising first and second elongate bearing elements on the support member which extend in the first direction and which are spaced apart in a second direction transverse to the first direction, the bearing means further comprising three bearing elements provided on the movable member, two of the bearing elements on the movable member being spaced apart in the first direction and cooperating with the first bearing element on the support member, at least said first bearing element on the support member and the two spaced apart bearing elements on the movable member which cooperate with said first bearing element having bearing surfaces of partially cylindrical shape, wherein the movable member comprises two pillars positioned one on each side of the support member.

13. A machine as claimed in claim 12, further comprising resilient means for urging at least one of said pillars towards the other of said pillars to produce a preloading force in the second direction between at least two of the bearing surfaces.

14. A machine comprising a movable member, a support member and bearing means for supporting the movable member on the support member for sliding movement in a first direction, the bearing means comprising first and second elongate bearing elements on the support member which extend in the first direction and which are spaced apart in a second direction transverse to the first direction, the bearing means further comprising only three bearing elements provided on the movable member, two of the bearing elements on the movable member being spaced apart in the first direction and cooperating with the first bearing element on the support member, at least said first bearing element on the support member and the two spaced apart bearing elements on the movable member which cooperate with said first bearing element having bearing surfaces of partially cylindrical shape, wherein the partially cylindrical bearing surface of said first bearing element on the support member is concave and the bearing surfaces of the spaced apart bearing elements on the movable member are convex.

15. A machine as claimed in claim 14, wherein the convex bearing surfaces of the spaced apart bearing elements on the movable member each have the form of at least one arc of a circle, the center of the arc lying within the movable member.

16. A machine as claimed in claim 14, wherein the first and second bearing elements on the support member have partially cylindrical bearing surfaces which face in opposite directions substantially parallel to the second direction, wherein the bearing elements on the movable member cooperate with the bearing elements on the support member and have partially cylindrical bearing surfaces which face in opposite directions substantially parallel to the second direction to confront the bearing surfaces on the support member, and wherein means are provided for producing a pre-loading force along the second direction between the confronting bearing surfaces.

17. A machine as claimed in claim 16, wherein the movable member comprises two pillars positioned one on each side of the support member, the bearing elements on the movable member being fixed to said pillars at one end of said pillars, said pillars being interconnected by a cross-member at the other end of said pillars, and wherein resilient means are provided for urging at least one of said pillars towards the other of said pillars to produce said pre-loading force.

18. A machine as claimed in claim 17, wherein one of said pillars is hollow at its other end and has a slit formed therein adjacent to the cross-member, said slit extending part way along the length of said one pillar, and wherein a compression spring is provided inside the hollow pillar which reacts against the cross-member to produce the pre-loading force.

19. A machine as claimed in claim 14, further comprising means for supplying gaseous fluid under pressure to the bearing surfaces.

20. A machine as claimed in claim 19, wherein the means for supplying gaseous fluid comprises a pair of jets disposed in a plane in which the second direction lies and in which a third direction orthogonal to the first and second directions lies, said jets being inclined with respect to the second direction at equal, opposite angles of more than 45°.

21. A machine as claimed in claim 14, wherein the second bearing element on the support member has a concave bearing surface of partially cylindrical shape, and wherein at least one bearing element on the movable member cooperates with the second bearing element on the support member and has a convex bearing surface having the form of at least one arc of a circle, the center of the arc lying within the movable member.

22. A machine as claimed in claim 21, wherein the center of the arc lies within the material from which the movable member is made.

23. A machine as claimed in claim 14, wherein the three bearing elements on the movable member each have a length that is less than the length of each of the first and second bearing elements on the support member.

24. A machine as claimed in claim 14, wherein the center of the arc lies within the material from which said one of the movable member and support member is made.

* * * * *